US 12,270,719 B2

United States Patent
Yang (10) Patent No.: US 12,270,719 B2
(45) Date of Patent: Apr. 8, 2025

(54) PRESSURE TRANSMITTER LONG-TERM DRIFT DETECTION AND CORRECTION

(71) Applicant: Honeywell International Inc., Charlotte, NC (US)

(72) Inventor: Wang Yang, Cave Creek, AZ (US)

(73) Assignee: Honeywell International, Charlotte, NC (US)

( * ) Notice: Subject to any disclaimer, the term of this patent is extended or adjusted under 35 U.S.C. 154(b) by 180 days.

(21) Appl. No.: 18/134,762

(22) Filed: Apr. 14, 2023

(65) Prior Publication Data

US 2024/0344913 A1  Oct. 17, 2024

(51) Int. Cl.
*G01L 19/08* (2006.01)

(52) U.S. Cl.
CPC .................... *G01L 19/08* (2013.01)

(58) Field of Classification Search
CPC . G01L 19/147; G01L 9/0072; G01L 19/0645; G01L 19/0084; G01L 13/025; G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627;
(Continued)

(56) References Cited

U.S. PATENT DOCUMENTS 6,237,394 B1 * 5/2001 Harris ................ G01L 9/065
73/1.88
7,007,551 B2  3/2006 Zdeblick et al.
(Continued)

FOREIGN PATENT DOCUMENTS

CN  109029841 A  * 12/2018
CN  110441027 A  * 11/2019 ............ G01M 9/06
(Continued)

OTHER PUBLICATIONS

Honeywell International Inc., "SmartLine Wireless Absolute Pressure Transmitter Specification 34-SW-03-02", Aug. 2019.
(Continued)

*Primary Examiner* — Andre J Allen
(74) *Attorney, Agent, or Firm* — Ortiz & Lopez, PLLC; Kermit D. Lopez; Luis M. Ortiz (57) ABSTRACT

A pressure transmitter and a method for enhancing the performance of the pressure transmitter, can involve obtaining pressure values from a pressure transmitter during a period of time in which pressure is not present in the process of a process control system, determining a long-term drift based on the obtained pressure values during the period of time in which pressure is not present in the process, and correcting the long-term drift by offsetting the amount of pressure measurement by the pressure transmitter to improve the measurement accuracy of the pressure transmitter. The long-term drift can be further determined with temperature measurements made by the pressure transmitter. In addition, a zero correction function may be performed to remove drift.

20 Claims, 6 Drawing Sheets

(58) Field of Classification Search
CPC ..... G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/12281; G01L 11/025; G01L 13/026; G01L 11/008; G01L 7/22; G01L 13/00; G01L 9/0047; G01L 9/0076; G01L 9/0025; G01L 7/08; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/00; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 7/06; G01L 1/2206; G01L 5/228; G01L 7/102; G01L 13/021; G01L 27/02; G01L 1/2262; G01L 1/24; G01L 1/26; G01L 19/144; G01L 23/00; G01L 9/0094; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 9/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2209/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC .................................................. 73/700–756

See application file for complete search history.

(56) References Cited

U.S. PATENT DOCUMENTS

| | | | |
|---|---|---|---|
| 7,398,688 B2 | 7/2008 | Zdeblick et al. | |
| 7,413,547 B1 | 8/2008 | Lichtscheidl et al. | |
| 8,387,463 B2 | 3/2013 | Hedtke | |
| 8,555,190 B2 | 10/2013 | Anne et al. | |
| 8,594,588 B2* | 11/2013 | Koukol, Jr. ............ | H04B 17/19 455/127.2 |
| 8,752,433 B2 | 6/2014 | Hedtke | |
| 9,279,794 B2 | 3/2016 | Tolmie et al. | |
| 10,378,987 B2 | 8/2019 | Hershey et al. | |
| 11,500,348 B2 | 11/2022 | Gopisetti et al. | |
| 2017/0167939 A1* | 6/2017 | Kastelein .............. | G01L 27/005 |
| 2022/0196447 A1* | 6/2022 | Byggmästar ........... | G01D 3/032 |

FOREIGN PATENT DOCUMENTS

| | | | | |
|---|---|---|---|---|
| CN | 118758356 A | * | 10/2024 | |
| DE | 102013225335 A1 | * | 11/2014 | ............ G01L 19/04 |
| JP | H07109372 B2 | * | 11/1995 | |
| WO | WO-2017105814 A1 | * | 6/2017 | ........... G01L 27/005 |

OTHER PUBLICATIONS

Honeywell International Inc., "STA700 SmartLine Absolute Pressure Specification 34-ST-03-100", 2013.

(56) References Cited

OTHER PUBLICATIONS

Honeywell International Inc., "Smartline Pressure Transmitters Modular, Accurate and Robust for the Lowest Cost of Ownership", 2021.
"Defining Drift", Premier Scales and Systems, downloaded Mar. 3, 2023, https://premierscales.com/what-is-measurement-drift/.

* cited by examiner

Transmitter Field Operation Illustration

$Tm_i$ = Maintenance Period, no process pressure in this period
$To_i$ = Operation Period, there are changes in pressure from process Amplifying for Details

500

Each Point Contains: $Pv_i$, $t_i$, $Temperature_i$
(Pressure) (Elapsed Time) (Transmitter Temperature)

Represents the Effects of: Noise from Pipes
Temperature Effects
Diaphragm Impacts
Sensor
Electronics (Voltage...)

PRESSURE TRANSMITTER LONG-TERM DRIFT DETECTION AND CORRECTION

TECHNICAL FIELD

Embodiments are related to field devices used in industrial process control systems. More particularly, embodiments relate to field devices such as process transmitters and methods, systems, and devices for detecting and correcting long-term drift. Embodiments further relate to methods, systems, and devices for improving the measuring accuracy of a field device such as a pressure transmitter.

BACKGROUND

Process instruments are used to monitor process parameters, such as pressure, temperature, flow and level, of process fluids used in industrial processes. For example, field devices such as process transmitters are typically employed in industrial manufacturing facilities at multiple locations to monitor a variety of process parameters along various production lines. Process transmitters include sensors that produce an electrical output in response to physical changes in the process parameter. For example, pressure transmitters include pressure transducers that produce an electrical output as a function of the pressure of a process fluid, such as in water lines, chemical tanks or the like. Each process transmitter also includes transmitter electronics and circuitry for receiving and processing the electrical output of the sensor so that the transmitter and process parameter can be monitored locally or remotely.

Locally monitored transmitters include displays, such as LCD screens, that show the electrical output at the site of the process transmitter. Remotely monitored transmitters include electronics and circuitry that transmit the electrical output over a control loop or network to a central monitoring location such as a control room. Configured as such, the process parameter can be regulated from the control room by including automated switches, valves, pumps and other similar components in the process control system and the control loop.

One of the problems with conventional process control systems is an inability to detect long-term drift in installed operational field devices, which effects measurement accuracy and confidence. In order to enhance the performance of pressure transmitters, long standing issues related to long-term drift detection and correction should be addressed.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide an improved field device for use with a process control system.

It is another aspect of the disclosed embodiments to provide methods, systems, and devices for improving the performance of a field device such as a pressure transmitter.

It is a further aspect of the disclosed embodiments to provide methods, systems, and devices for long-term detection and correction.

It is an additional aspect of the disclosed embodiments to provide for an improved pressure transmitter.

The aforementioned aspects and other objectives can now be achieved as described herein. In an embodiment, a method for enhancing a performance of a pressure transmitter, can involve: obtaining a plurality of pressure values from a pressure transmitter during a period of time in which pressure is not present in a process of a process control system; determining a long-term drift based on the obtained plurality of pressure values during the period of time in which pressure is not present in the process; and correcting the long-term drift by offsetting an amount of pressure measurement by the pressure transmitter to improve a measurement accuracy of the pressure transmitter.

In an embodiment, the long-term drift can be further determined with temperature measurements made by the pressure transmitter.

In an embodiment, the period of time may be a maintenance period.

In an embodiment, correcting the long-term drift can further involve performing a zero correction function to remove drift.

In an embodiment, correcting the long-term drift may involve performing a zero correction function to remove drift when the long-term drift is determined to be above a published specification but moderate parameter.

In an embodiment, the period of time can be an accumulated period of time.

In an embodiment, the pressure transmitter may be one or more of: a differential pressure transmitter, a gauge pressure transmitter, an absolute pressure transmitter, or a multivariable pressure transmitter.

In an embodiment, the pressure transmitter can detect and alert a user when an auto drift correction cannot be applied to correcting the long-term drift.

In an embodiment, a method for enhancing a performance of a field device can involve: obtaining a plurality of measured values for a condition from a field during a period of time in which the condition is not present in a process of a process control system; determining a long-term drift based on the obtained plurality of measured values during the period of time in which the condition is not present in the process; and correcting the long-term drift by offsetting an amount of condition measured by the field device to improve a measurement accuracy of the field device.

In an embodiment, a field device for monitoring conditions in a process control system, can include a pressure transmitter, wherein a plurality of pressure values can be obtained from the pressure transmitter during a period of time in which pressure is not present in a process of the process control system, a long-term drift can be determined based on the obtained plurality of pressure values during the period of time in which pressure is not present in the process, and the long-term drift can be corrected by offsetting the amount of pressure measurement by the pressure transmitter to improve the measurement accuracy of the pressure transmitter.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Identical or similar parts or elements in the figures may be indicated by the same reference numerals.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in an embodiment" or "in one embodiment" or "in an example embodiment" and variations thereof as utilized herein may or may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. Furthermore, the term "at least one" as used herein, may refer to "one or more." For example, "at least one widget" may refer to "one or more widgets."

In addition, the term "based on" may be understood as not necessarily intended to convey an exclusive set of factors and may, instead, allow for existence of additional factors not necessarily expressly described, again, depending at least in part on context.

Figure 1:
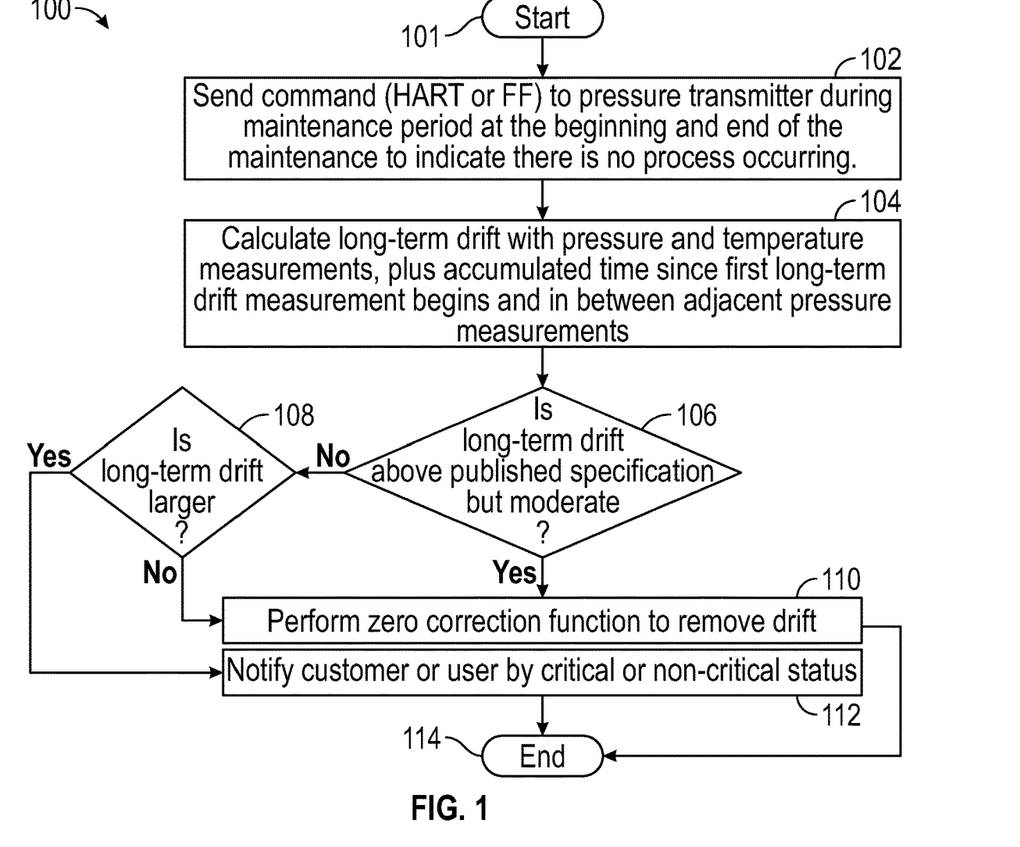
FIG. 1 illustrates a flow chart of operations depicting logical operational steps of a method for long-term drift detection and correction, in accordance with an embodiment.

FIG. 1 illustrates a flow chart of operations depicting logical operational steps of a method 100 for long-term drift detection and correction, in accordance with an embodiment. As shown at block 101, the process can begin. Note that the methods and operational steps/instructions discussed herein can be applied to different types of field devices, which may be wired and/or wireless. Examples of such field devices include pressure transmitters such as the pressure transmitter 200 shown in FIG. 5 and FIG. 6. Process control systems such as industrial plants and facilities usually have scheduled facility maintenance periods during which there is no pressure in the process of the process control system. The approach disclosed herein can use this maintenance period (e.g., a few minutes, weeks, months, or years), to conduct measurement and calculation.

During a period of time such as the aforementioned maintenance period, the process control system can send a command to the pressure transmitter 200 at the beginning and end of the maintenance to indicate there is no process going on, as indicated at block 102, or let the pressure transmitter 200 detect the maintenance period. This command (or commands) and/or the sending of this command may be implemented by any communication protocol, for example, HART® (Highway Addressable Remote Transducer) FF (FOUNDATION® FIELDBUS), PROFIBUS®, PROFINET®, EtherNet/IP®, or OPC UA® commands. Thereafter, as shown at block 104, a step or operation can be implemented in which the pressure transmitter 200 can calculate long-term drift with pressure and temperature measurements, plus accumulated time since first long-term drift measurement starts and in between adjacent pressure measurements. These parameters may be known by the pressure transmitter 200.

If the long-term drift is above a published specification, but moderate, an operation can be implemented as shown at decision block 106 and 110 to perform a zero correction function to remove the drift.

Note that the term 'zero correction function' as utilized herein can relate to a mathematical or computational procedure, which can be used to adjust measurements or data by taking into account the effect of an inherent bias or offset in the measuring instrument or system, which in this case may be a field device such as a pressure transmitter. In other words, a zero correction function is a way to correct for the fact that the instrument may not give a perfectly accurate reading when there is no input signal or when the input signal is at zero.

For example, assume you are measuring the temperature of a substance using a thermometer that is known to have a small but consistent error at zero degrees Celsius. To correct for this error, you can use a zero correction function that adjusts the measured temperature by a certain amount based on the known error at zero degrees Celsius.

In general, a zero correction function can be a simple offset or a more complex mathematical formula that takes into account various factors that affect the measurement. A goal of a zero correction function can be to improve the accuracy and reliability of the measurement by accounting for any known sources of error or bias in the measuring instrument or system.

Assuming that the long-term drift is below the published specification then operations can be performed to determine if the long-term is larger and if so, notifications made to a user or customer of a critical or non-critical status with a message to indicate that further actions may be taken to address these situations, as shown at blocks 108 and 112. The method 100 can then end, as shown at block 114.

In some embodiments, the calculation step shown in block 104 can be implemented using steps or operations for calculating pressure transmitter output long-term drift with a unique mathematical solution. Input to the mathematical equations of this solution can include pressure values whenever no process is occurring in the process control system, the accumulated time, and environmental temperature (optional, to enhances accuracy). The output of this equation is the amount of long-term drift, for automatic long-term drift correction.

Two equations can be used as part of this solution:

AccumulatedEnergy=sum[absolute (PV_at_timeIdx)*timeInterval*temperature_factor]   Equation 1:

MovingEnergy=sum [PV_at_timeIdx*timeInterval*temperature_factor]   Equation 2:

A combination of Equation 1 and Equation 2 can be used to calculate long-term drift at any given time. A factor "temperature_factor" can be added to include accuracy impact of varying environmental temperature. This factor can be scaled to the reciprocal of the environmental temperature performance specification. Once the long-term drift is detected, it can be corrected by offsetting the amount to the pressure measurement, to improve measurement accuracy.

Figure 2:
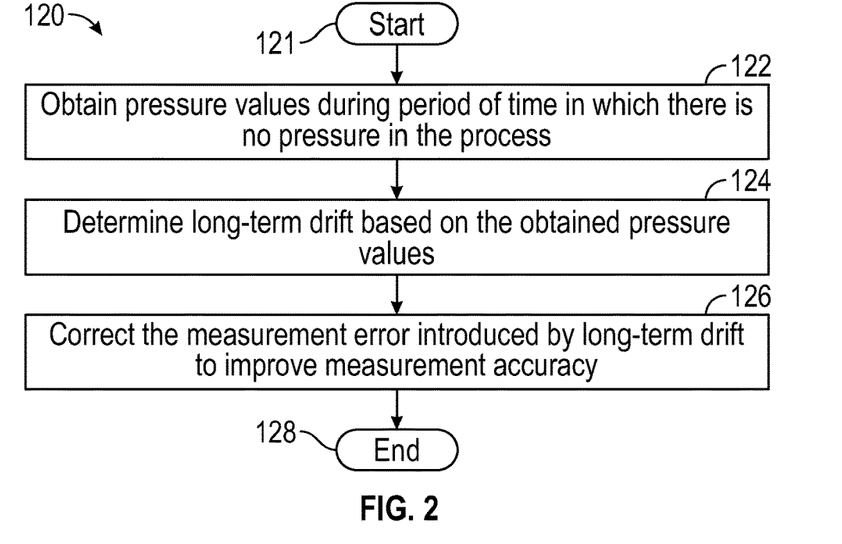
FIG. 2 illustrates a flow chart of operations depicting logical operational steps of a method for improving the measuring accuracy of a pressure transmitter, in accordance with an embodiment.

FIG. 2 illustrates a flow chart of operations depicting logical operational steps of a method 120 for improving the measuring accuracy of a pressure transmitter, in accordance with an embodiment. A shown at block 121, the process can begin. Next, as shown at block 122, a step or operation can be implemented to obtain pressure values from a pressure transmitter such as the pressure transmitter 200 during a period of time in which pressure is not present in the process of the process control system. Note that the pressure values may include pressure values when there is no process occurring, along with accumulated time and optionally environmental temperature data (which may be optional to enhance accuracy).

Next, as shown at block 124, a step or operation can be implemented to determine (e.g., calculate) the long-term drift based on the obtained pressure values during the period of time (e.g., maintenance period(s)) in which pressure is not present in the process of the process control system. Thereafter, as shown at block 126, a step or operation can be implemented to correct the measurement error introduced by long-term drift to improve the measurement accuracy of the pressure transmitter 200. Note that the long-term drift correction operation shown at block 126 can involve performing a zero correction function to remove drift when the long-term drift is determined to be above a published specification but moderate parameter. The method can then end as shown at block 128.

Figure 3:
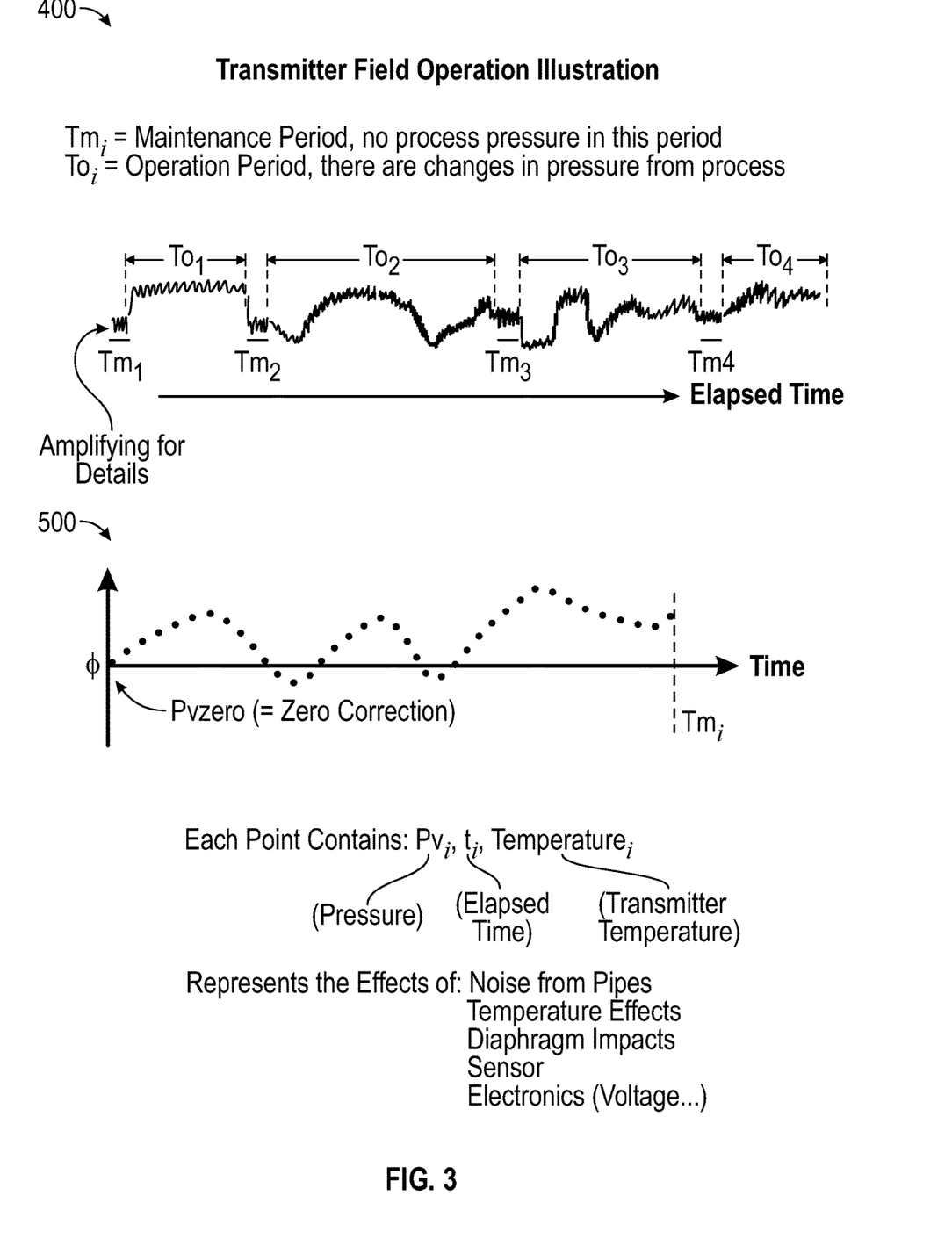
FIG. 3 illustrates graphs depicting data indicative of pressure transmitter field operations, in accordance with an embodiment.

FIG. 3 illustrates graphs 140 and 150 depicting data indicative of pressure transmitter field operations, in accordance with an embodiment. The following parameters are used with respect to graphs 140 and 150:

$T_{mi}$=maintenance period, no process pressure in this period $T_{Oi}$=operation period, there are changes in pressure from process In graph 140, four example operational time periods are shown as $T_{O1}$, $T_{O2}$, $T_{O3}$, and $T_{O4}$ over an elapsed time. In addition, graph 140 also depicts four maintenance periods $T_{m1}$, $T_{m2}$, $T_{m3}$, and $T_{m4}$ over the elapsed time. Note that there is no limit on the length of $T_{Oi}$. That is, $T_{Oi}$ can represent, for example, hours, weeks, months or years. There is also no specific length requirement for $T_{mi}$, which may be as short as hours or as long as days, months, etc. Note that $\Sigma_{i=0}^{n}$ (Tmi+Toi) should be at least one year (per specification definition) for reliable drift measurement and should include at least $T_{mi}$ and $T_{Oi}$.

Graph 150 shows an example plot of zero correction data plotted over time. Each point on the plot plots $pv_i$ (pressure), $t_i$ (elapsed time), and temperature$_i$ (the pressure transmitter temperature). Graph 150 represents the effects of, for example, noise from pipes, temperature effects, diaphragm impacts, sensor electronics (e.g., voltage, etc.). Note that if pv drift≥specification, the zero correction may be performed during the maintenance period(s) $T_{mi}$.

Figure 4:
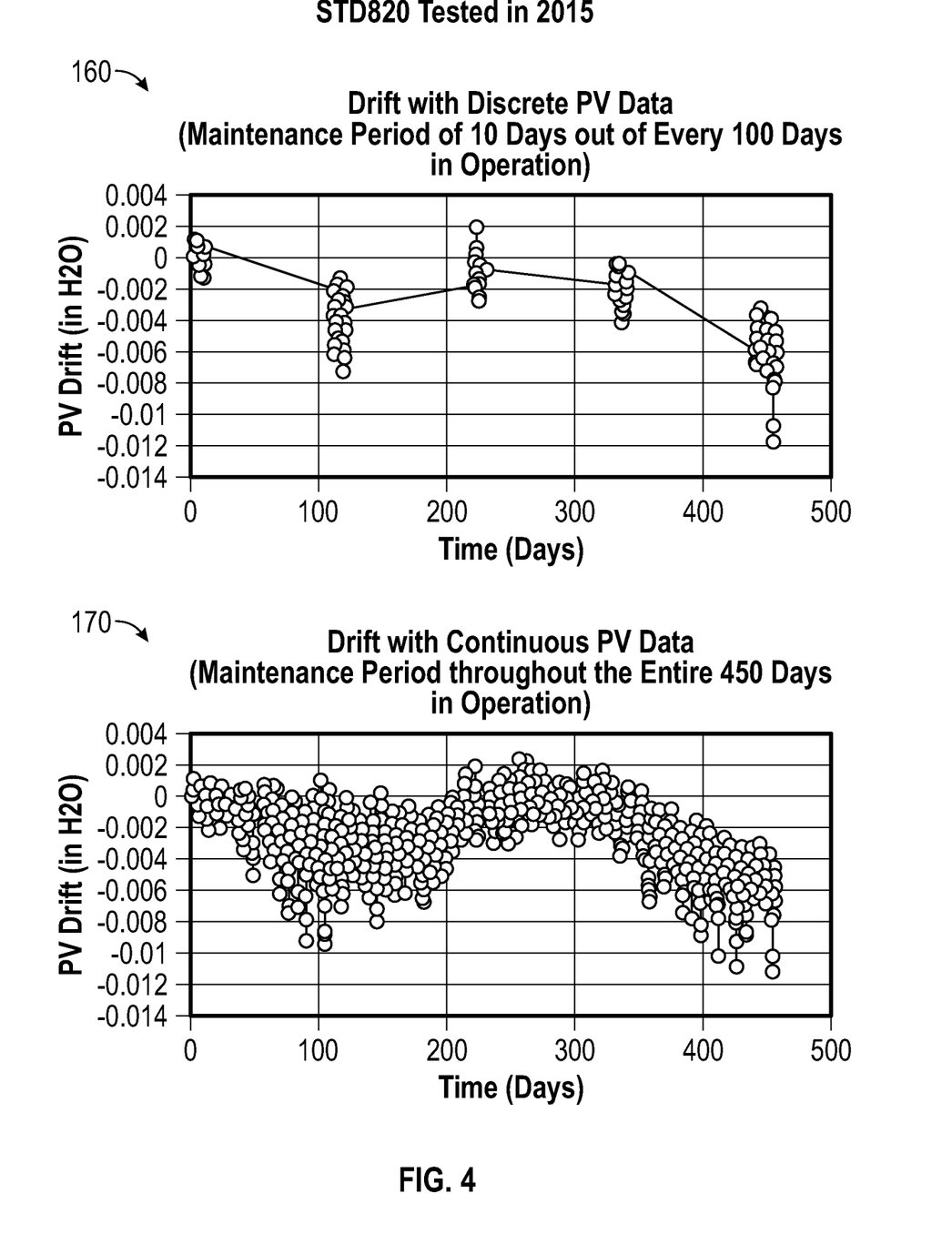
FIG. 4 illustrates graphs depicting data indicative of example pressure transmitter drift calculations, in accordance with an embodiment.

FIG. 4 illustrates graphs 160 and 170 depicting data indicative of example pressure transmitter drift calculations, in accordance with an embodiment. Graph 160 shown in FIG. 4 plots data indicative of drift with discrete PV data collected from a pressure transmitter over a period of time (maintenance period) of 10 days out of every 100 days in operation of a process control system. In graph 160 PV draft data is shown on the y-axis versus a period of time (in days) on the x-axis.

Graph 170 shows example drift data with continuous PV data for a maintenance period throughout the entire 450 days of operation. Graphs 160 and 170 are presented with respect to an example 400 inches H2O pressure transmitter for differential pressure transmitter drift calculations which are very close with two difference test conditions. That is, graph 160 is related to a maintenance period of 10 days out of every 100 days in operation, and graph 170 relates to a maintenance period throughout the entire 450 days in operation.

Figure 5:
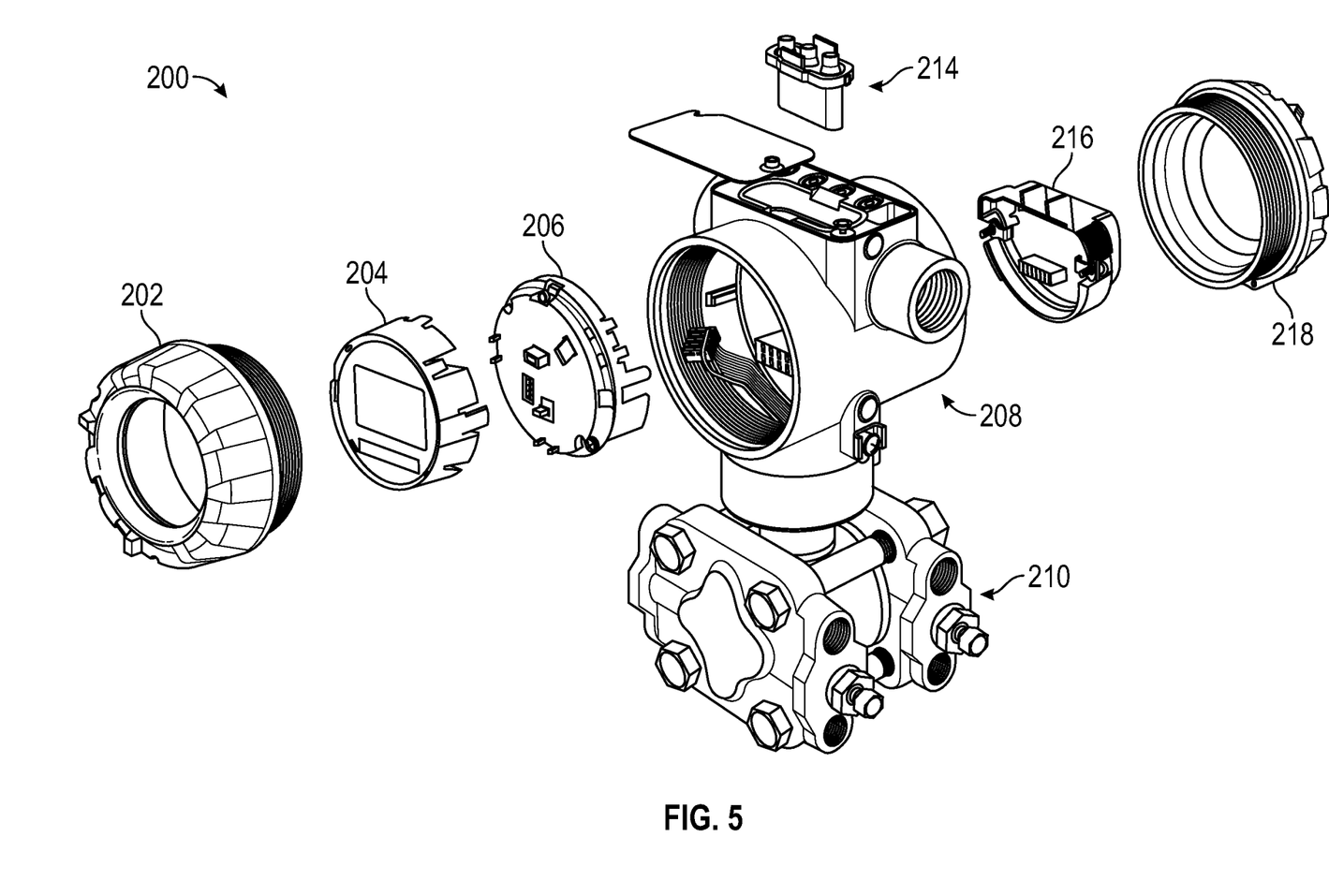
FIG. 5 illustrates an exploded pictorial view of a pressure transmitter, which may be implemented in accordance with an embodiment.
Figure 6:
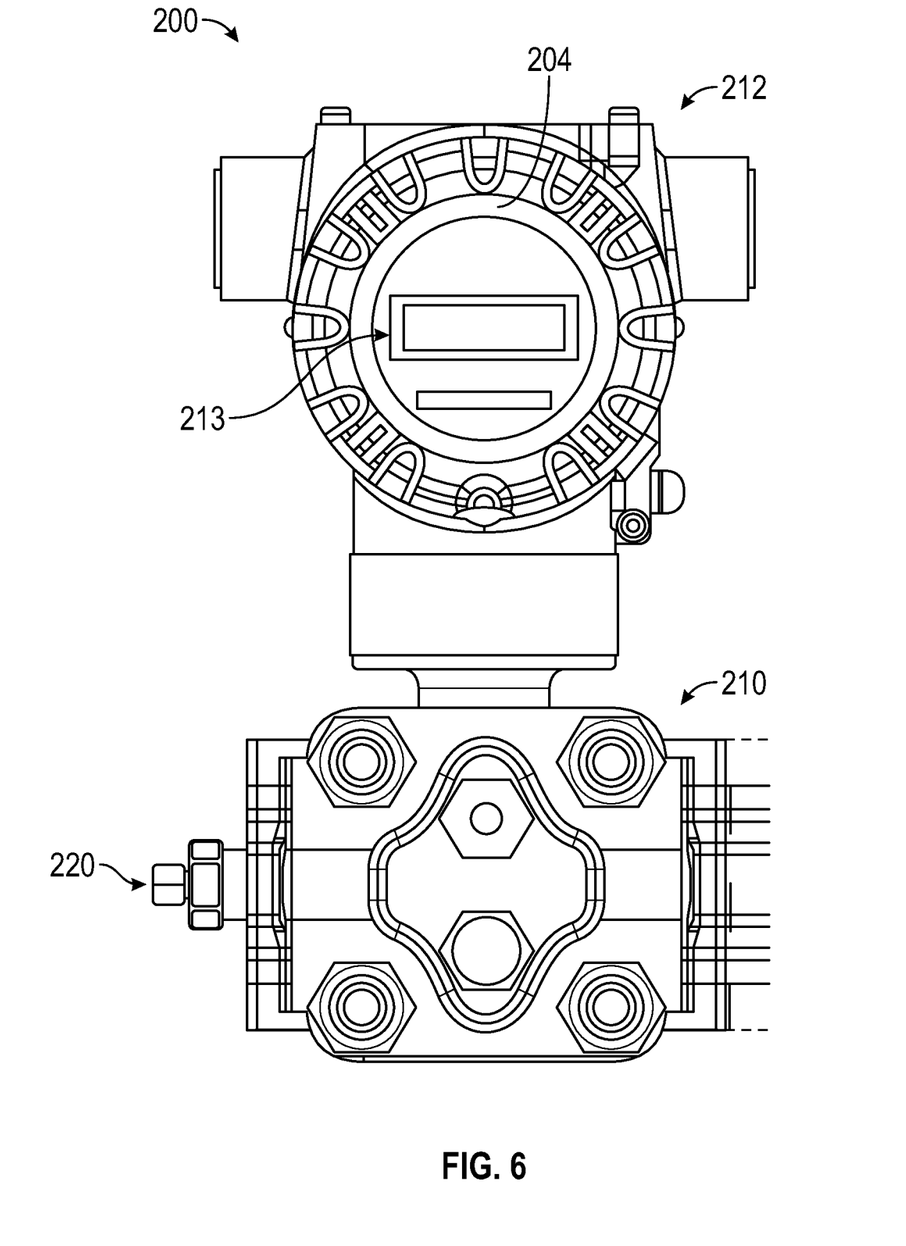
FIG. 6 illustrates a front pictorial view of the pressure transmitter shown in FIG. 6, in accordance with an embodiment.

FIG. 5 illustrates an exploded pictorial view of a pressure transmitter 200, which may be implemented in accordance with an embodiment. FIG. 6 illustrates a front pictorial view of the pressure transmitter 200 shown in FIG. 5, in accordance with an embodiment. Note that the pressure transmitter 200 may be implemented as any number of different pressure transmitter types. For example, the pressure transmitter 200 can be a differential pressure transmitter, a gauge pressure transmitter, an absolute pressure transmitter, a multi-variable pressure transmitter, or another type of pressure transmitter.

The pressure transmitter 200 shown in FIG. 5 and FIG. 6 is provided for illustrative and exemplary purposes only and should not be considered a limiting feature of the embodiments. The pressure transmitter 200 can include a liquid crystal display unit 206 that is surrounded by a circular cap 202. The pressure transmitter 200 further includes a pressure sensor and transmitter unit 208 with internal components 206 and 214. Another cap 218 is also included with the pressure transmitter 200 and encloses another internal component 216. The pressure sensor and transmitter unit 208 can connect to a mounting bracket 210. The liquid crystal display unit 206 includes a display 213 shown in FIG. 6. A vent/end drain 220 is also depicted in FIG. 6.

A non-limiting example of pressure transmitter 200 is disclosed in the document entitled "STA700 SmartLine Absolute Pressure Specification 34-ST-03-100" from Honeywell International Inc., February 2013, which is incorporated herein by reference in its entirety.

Figure 7:
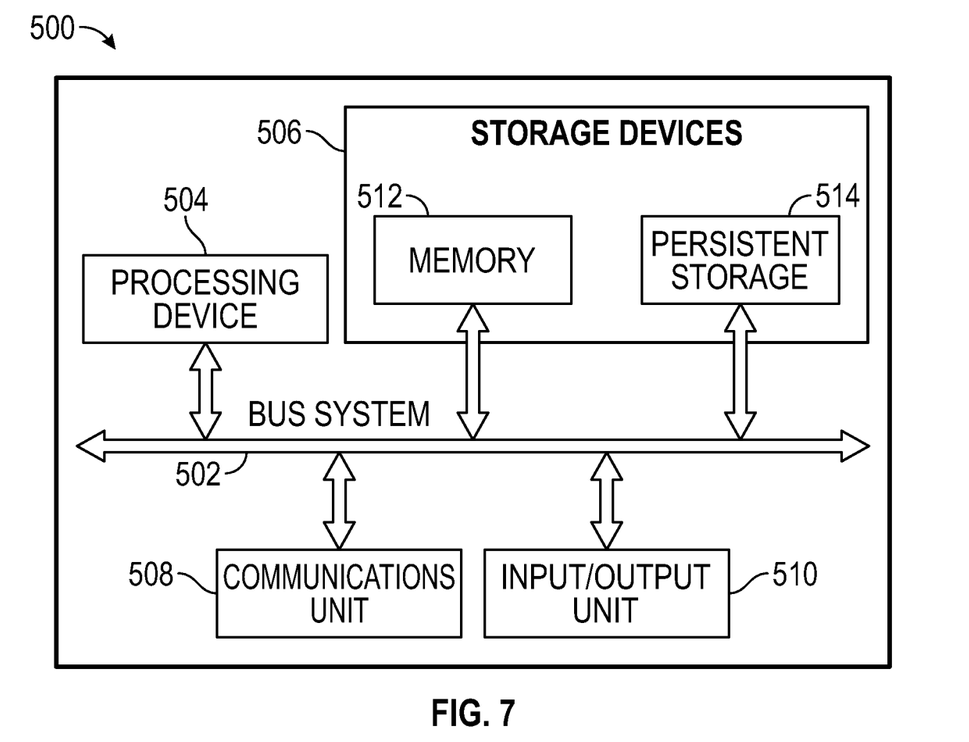
FIG. 7 illustrates a block diagram depicting one example of a device for long-term drift correction and detection, which may be implemented in accordance with an embodiment.

FIG. 7 illustrates a block diagram depicting an example device 500 for long-term drift correction and detection, which may be implemented in accordance with an embodiment. The device 500 can, for example, represent a mobile computing device and/or another type of computing device such as desktop computer, server, smartphone, and so on. Additionally, or alternatively, portions of the device 500 can represent portions of a field instrument such as the pressure transmitter 200. The device 500 may represent any other suitable device for improved power utilization in a field instrument in a process control system.

As shown in FIG. 7, the device 500 can include a bus system 502, which supports communication between at least one processing device 504, at least one storage device 506, at least one communications unit 508, and at least one input/output (I/O) unit 510. The processing device 504 executes instructions that may be loaded into a memory 512. The processing device 504 may include any suitable number(s) and type(s) of processors or other devices in any suitable arrangement. Example types of processing devices 504 include microprocessors, microcontrollers, digital signal processors, field programmable gate arrays, application specific integrated circuits, and discrete circuitry.

The memory 512 and a persistent storage 514 are examples of storage devices 506, which represent any structure(s) capable of storing and facilitating retrieval of information (such as data, program code, and/or other suitable information on a temporary or permanent basis). The memory 512 may represent a random access memory or any other suitable volatile or non-volatile storage device(s). The persistent storage 514 may contain one or more components or devices supporting longer-term storage of data, such as a ready only memory, hard drive, Flash memory, or optical disc. In accordance with this disclosure, the memory 512 and the persistent storage 514 may be configured to store instructions associated with improved performance in a field instrument in a process control system.

The communications unit 508 can support communications with other systems, devices, or networks. For example, the communications unit 508 can include a network interface that can facilitate communications over at least one Ethernet network. The communications unit 508 can also include a wireless transceiver facilitating communications over at least one wireless network. The communications unit 508 may support communications through any suitable physical or wireless communication link(s).

The I/O unit 510 can allow for the input and output of data. For example, the I/O unit 510 may provide a connection for user input through a keyboard, mouse, keypad, touchscreen, or other suitable input device. The I/O unit 510 may also send output to a display, printer, or other suitable output device.

Although FIG. 5 illustrates one example of a device 500 for improved power utilization in a field instrument in a process control system, various changes may be made to FIG. 5. For example, various components in FIG. 5 could be combined, further subdivided, or omitted and additional components could be added according to particular needs. Also, computing devices can come in a wide variety of configurations, and FIG. 5 does not limit this disclosure to any particular configuration of device.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware or a combination of hardware and software/firmware. The functionality associated with any particular controller may be centralized or distributed, whether locally or remotely.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for enhancing a performance of a pressure transmitter, comprising:
    obtaining a plurality of pressure values from a pressure transmitter during a period of time in which pressure is not present in a process of a process control system;
    determining a long-term drift based on the obtained plurality of pressure values during the period of time in which pressure is not present in the process; and correcting the long-term drift by offsetting an amount of pressure measurement by the pressure transmitter to improve a measurement accuracy of the pressure transmitter.

2. The method of claim 1 wherein the long-term drift is further determined with temperature measurements made by the pressure transmitter.

3. The method of claim 1 wherein the period of time comprises at least one of: a maintenance period or an accumulated period of time.

4. The method of claim 1 wherein correcting the long-term drift further comprises performing a zero correction function to remove drift.

5. The method of claim 1 wherein correcting the long-term drift further comprises:
performing a zero correction function to remove drift when the long-term drift is determined to be above a published specification but moderate parameter.

6. The method of claim 1 wherein the pressure transmitter detects and alerts a user when an auto drift correction cannot be applied to correcting the long-term drift.

7. The method of claim 1 wherein the pressure transmitter comprises at least one of:
a differential pressure transmitter;
a gauge pressure transmitter;
an absolute pressure transmitter; or
a multi-variable pressure transmitter.

8. A method for enhancing a performance of a field device, comprising:
obtaining a plurality of measured values for a condition from a field during a period of time in which the condition is not present in a process of a process control system;
determining a long-term drift based on the obtained plurality of measured values during the period of time in which the condition is not present in the process; and
correcting the long-term drift by offsetting an amount of condition measured by the field device to improve a measurement accuracy of the field device.

9. The method of claim 8 wherein the period of time comprises a maintenance period.

10. The method of claim 8 wherein correcting the long-term drift further comprises performing a zero correction function to remove drift.

11. The method of claim 9 wherein correcting the long-term drift further comprises:
performing a zero correction function to remove drift when the long-term drift is determined to be above a published specification but moderate parameter.

12. The method of claim 8 wherein the period of time comprises an accumulated period of time.

13. The method of claim 1 wherein the field device comprises a pressure transmitter.

14. A field device for monitoring conditions in a process control system, comprising:
a pressure transmitter, wherein:
a plurality of pressure values is obtained from the pressure transmitter during a period of time in which pressure is not present in a process of the process control system;
a long-term drift is determined based on the obtained plurality of pressure values during the period of time in which pressure is not present in the process; and
the long-term drift is corrected by offsetting an amount of pressure measurement by the pressure transmitter to improve a measurement accuracy of the pressure transmitter.

15. The field device of claim 14 wherein the long-term drift is further determined with temperature measurements made by the pressure transmitter.

16. The field device of claim 14 wherein the period of time comprises a maintenance period.

17. The field device of claim 14 wherein correcting the long-term drift further comprises performing a zero correction function to remove drift.

18. The field device of claim 14 wherein correcting the long-term drift further comprises performing a zero correction function to remove drift when the long-term drift is determined to be above a published specification but moderate parameter.

19. The field device of claim 14 wherein the period of time comprises an accumulated period of time.

20. The field device of claim 14 wherein the pressure transmitter comprises at least one of:
a differential pressure transmitter;
a gauge pressure transmitter;
an absolute pressure transmitter; or
a multi-variable pressure transmitter.

* * * * *